Aug. 15, 1961  A. E. FARR ET AL  2,996,270
FORCE LIMITING DEVICE
Filed May 27, 1960
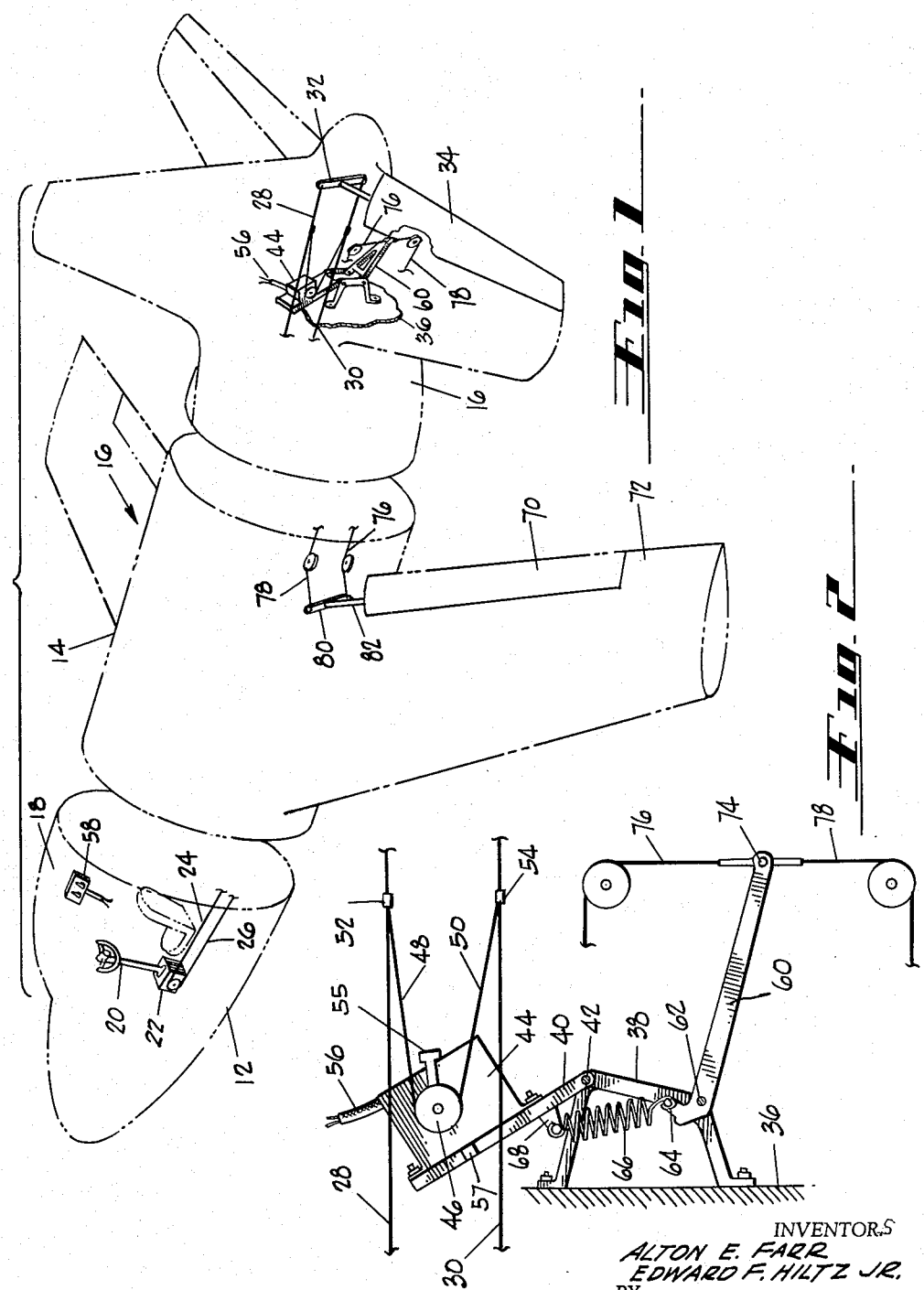
INVENTORS
ALTON E. FARR
EDWARD F. HILTZ JR.
BY
Edwin Coates
-ATTORNEY-

2,996,270
FORCE LIMITING DEVICE
Alton E. Farr, Rolling Hills, and Edward F. Hiltz, Jr., Los Angeles, Calif., assignors to Douglas Aircraft, Inc., Santa Monica, Calif.
Filed May 27, 1960, Ser. No. 32,316
6 Claims. (Cl. 244—76)

This invention pertains to force limiting devices and more particularly to a device which will limit the amount of force imparted by a servo mechanism or servo motor to certain control surfaces on an airplane or to their control means.

One of the principal purposes of the device of this invention is to provide a means for limiting to a safe value the control force resulting from the torque output developed during certain flight and emergency conditions by an aircraft autopilot elevator control servo motor in order to prevent the transmission of excessive forces to the elevator control cables and correspondingly overstressing the control surfaces themselves. By the same means excessive aerodynamic control effects are avoided.

The device is so designed and adjusted that during ordinary operation of the airplane the forces imparted to the control cables by the servo motor will not exceed the normal pre-load value of the device. If the servo motor receives a signal for maximum action or if it should malfunction, then it may well apply a force to the control cables which exceeds their design load and likewise overstress the elevator surface as well as the airplane itself by causing a violent maneuver. The novel mechanism of this invention provides for yieldable bodily movement by the servo motor in immediate response to generation of forces beyond the design limit and thus prevents their transmission to the aerodynamic control system.

The force necessary to displace the elevator to any given degree is a function of the speed of the airplane. Thus, at high speeds the control forces must be greater than at low speeds for the same elevator movement. However, the aerodynamic effect of the elevator increases rapidly with speed and hence only relatively small movements are needed at high speeds to produce the maximum desired effect. The net result is that less force is required or desirable at high speeds than at low speeds. Therefore the yielding force control mechanism must provide less resistance to yielding at high speeds than at low speeds. The problem of the necessary adjustment is solved in this invention by taking advantage of the fact that flaps are always retracted at high speeds and extended only at low speeds, as for landing. The position of the flaps is used to control the resistance of the device. As the flaps are lowered to extended position the force control mechanism is adjusted to increase its resistance to yielding movement of the servo motor.

Briefly described, the force control or force limiting mechanism of this invention includes a support member fixed on the structure of the airplane and a servo motor pivotally mounted on the support member. The servo motor has a driving drum from which extend two runs of drive cables which are connected to the control cables leading to the elevator or other aerodynamic control surface. A lever is pivotally mounted on the support member and one end is connected to the servo motor by a coil spring. The other end is attached to cables which extend to the flap operating region of the airplane and are operated by movements of the flap to swing the lever about its pivot. In the "flap-up" position the spring is tensioned to a relatively small extent. As the flap is lowered, the lever is swung to a position increasing the tension in the spring. The spring tension controls the yieldability of the servo motor.

The entire mechanism is so arranged and adjusted that, when the flaps are fully down and the resistance is greatest, normal operation of the servo motor will cause full operation of the control cables with little or no yielding but abnormal high torque action of the servo motor will cause sufficient yielding to limit the control force to predetermined safe limits. When the flaps are retracted, the resistance is less and there will be correspondingly more yielding of the servo motor about its pivot.

These and other features and advantages of the invention will become more apparent as the description proceeds in connection with the attached drawing, in which:

FIG. 1 is a broken perspective view of an airplane in which certain control mechanisms including the force limiting mechanism are shown largely in diagrammatic form; and FIG. 2 is a side elevational view, partly in section, showing the form and arrangement of the essential elements of the mechanism.

Referring first to FIG. 1, an airplane 10 includes a nose portion 12, a mid portion 14, and a tail portion 16. The nose portion, as is usual, contains a pilot's compartment 18 including a control column 20. From the column support 22 extend a pair of elevator control cables 24, 26. These may extend directly to the elevator but in most modern large high speed aircraft they lead to a servo motor, not shown. From such a servo motor, control cables 28, 30 extend to elevator actuating lever 32 which rotates elevator 34 about its pivotal supports.

A support member 36 is fixed to the structure of the tail portion of the airplane and a bracket as support member 38 is rigidly attached thereto. Referring to both figures, it will be seen that an arm 40 is pivotally attached to support 38 at 42. A servo motor 44 is mounted on arm 40 by conventional fastening means and the assembly is free to swing clockwise or counterclockwise as viewed in FIG. 2. The servo motor carries a drum 46 on which are wound several turns of cable, terminating in drive cables 48, 50 which are joined to control cables 28, 30 at 52, 54. Electrical conductor means 56 extends to the autopilot 58 in the pilot's compartment and the servo motor is controlled by signals therefrom.

A lever 60 is pivotally mounted intermediate its ends on bracket 38 at 62. A first end 64 serves as a connection for the lower end of coil spring 66. Arm 40 is provided with a boss 68 to which the upper end of the spring is attached. In the position shown, the spring is under that amount of tension which will produce the proper resistance to yielding of the servo motor to loads produced in the drive cables in the higher speed regimes. When lever 60 is rotated counterclockwise to a predetermined degree it will increase the tension in the spring and hence resistance to yielding of the servo motor to the extent necessary for the lower speed regimes. In addition, the resistance to yielding of the servo motor is incurred by the increase of the lever arm between the pivot point 42 and the line of force of the spring 66 This provides an added variable to increase the resistance to yielding of the servo motor.

The appropriate movement of lever 60 is accomplished by its operative connection to flap 70 movably mounted on wing 72. The second end 74 of the lever is connected to cables 76, 78 which extend to and are connected to lever 80 carried by shaft 82. The shaft is rotated clockwise, as seen in FIG. 1, when the flap is lowered and counter-clockwise when it is retracted.

To keep the mechanism within its designed operable limits the drum 46 has attached to it a stop 55 which engages a fixed stop 57 on the arm 40 at the desired outer limits of rotation of the drum 46.

When the mechanism is at its low output position or seen in FIG. 2, the point of attachment of spring 66 to boss 68, the first end 64 of lever 60, and the pivot point 62 of lever 60 define a straight line. This orientation of these points provides a fail safe feature. If one of the cables 76, 78 should break, the lever 60 will pivot about 62 until the points of attachment of the spring are in line with it and the low output position has been reached.

It will now be seen that servo motor 44 is biased to exert a tension force in drive cables 48, 50 at all times, the amount of resistance to yielding being controlled by flap position so that resistance is higher at low speeds to accomplish the necessary greater throw of the elevator. At the same time if maximum torque is applied to drum 46 in either direction of rotation, the excessive force in cable 48 or 50 will pull the servo motor clockwise against the resistance of spring 66 and thus reduce the loads going into the control cables and elevator to a predetermined safe value. As the arm 40 rotates, the increased tension in the spring 66 is offset by a decrease of the lever arm between the pivot point 42 and the line of force of the spring 66 which produces a flat spring rate, that is, a constant force on the drive cables 48, 50. While the elevator is used as an example, it is obvious that the force limiting mechanism can be applied to any control surface where the problem arises.

It will be apparent to those skilled in the art that various changes and modifications can be made in the details of construction as shown and described, and it is intended that all such changes and modifications shall be embraced within the scope of the following claims.

We claim:

1. In an airplane including a flap movably mounted on a wing thereof and a pivotally supported elevator, means for controlling the movement of said elevator, comprising: a pair of control cables operatively attached to said elevator; a servo motor; drive cables extending from said servo motor and attached to said control cables; a support member fixedly mounted in said airplane; means mounting said servo motor for rotation thereon; a lever pivotally mounted intermediate its ends on said support member; spring means extending between said servo motor and a first end of said lever to yieldingly rotate said servo motor to produce tension in said drive cables; and means operatively connecting the second end of said lever to said flap to produce rotation of said lever in accordance with the position of said flap and thereby vary the resistance of said spring means and the tension in said drive cables.

2. In an airplane including a flap movably mounted on a wing thereof and a pivotally supported elevator, means for controlling the movement of said elevator, comprising: a pair of control cables operatively attached to said elevator; a servo motor; drive cables extending from said servo motor and attached to said control cables; a support member fixedly mounted in said airplane; means mounting said servo motor for rotation thereon; force control means movably mounted on said support member; spring means extending between said servo motor and said force control means to yieldingly rotate said servo motor to produce tension in said drive cables; and means operatively connecting said force control means to said flap to produce positioning of said force control means in accordance with the position of said flap and thereby vary the resistance of said spring means and the tension in said drive cables.

3. In an airplane including a flap movably mounted on a wing thereof and a pivotally supported elevator, means for controlling the movement of said elevator, comprising: a pair of control cables operatively attached to said elevator; a servo motor; drive cables extending from said servo motor and attached to said control cables; a support member fixedly mounted in said airplane; means mounting said servo motor for rotation thereon; yieldable force applying means carried by said support and attached to said servo motor to rotate the latter and produce tension in said drive cables; and means operatively connecting said force applying means to said flap to vary the resistance thereof in accordance with the position of said flap and thereby vary the tension in said drive cables.

4. In an airplane including a flap movably mounted on a wing thereof and a pivotally supported elevator, means for controlling the movement of said elevator, comprising: a pair of control cables operatively attached to said elevator; a servo motor; drive cables extending from said servo motor and attached to said control cables; a support member fixedly mounted in said airplane; means mounting said servo motor for rotation thereon; yieldable force applying means attached to said servo motor to rotate the latter and produce tension in said drive cables and adjustable to vary said tension; and means operable to adjust said force applying means to produce reduced tension in high speed regimes and increased tension in low speed regimes.

5. Means to control the movement of a pair of control cables for an aerodynamic control surface of an airplane, comprising: a support; a servo motor pivotally mounted thereon; drive cables extending from said servo motor for connection to said control cables; spring means connected to said servo motor to rotate the latter and produce tension in said drive cables; adjustment means on said support and attached to said spring means to vary the resistance thereof; and means operable in accordance with the speed regime of the airplane to vary the adjustment means.

6. Means to control the movement of a pair of control cables for an aerodynamic control surface of an airplane, comprising: a support; a servo motor movably mounted on said support; drive cables extending from said servo motor for connection to said control cables; adjustable means yieldingly urging said servo motor in a direction to produce tension in said drive cables; and means operable in accordance with the speed regime of said airplane to increase the force of said adjustable means in low speed regimes and to decrease the force thereof in high speed regimes.

No references cited.